(12) United States Patent
Lemer et al.

(10) Patent No.: US 9,347,805 B2
(45) Date of Patent: May 24, 2016

(54) METHOD FOR OPTIMALLY DETERMINING THE CHARACTERISTICS AND ARRANGEMENT OF A SET OF SENSORS FOR MONITORING AN AREA

(75) Inventors: Alain Lemer, Gennevilliers (FR); Frédérique Ywanne, Gennevilliers (FR)

(73) Assignee: Thales, Courbevoie (FR)

( * ) Notice: Subject to any disclaimer, the term of this patent is extended or adjusted under 35 U.S.C. 154(b) by 656 days.

(21) Appl. No.: 13/812,137

(22) PCT Filed: Jul. 15, 2011

(86) PCT No.: PCT/EP2011/062119
§ 371 (c)(1),
(2), (4) Date: Feb. 20, 2013

(87) PCT Pub. No.: WO2012/013517
PCT Pub. Date: Feb. 2, 2012

(65) Prior Publication Data
US 2013/0218499 A1  Aug. 22, 2013

(30) Foreign Application Priority Data
Jul. 27, 2010  (FR) ..................................... 10 03147

(51) Int. Cl.
*G01D 18/00* (2006.01)
*G06F 15/00* (2006.01)
*G06F 17/50* (2006.01)

(52) U.S. Cl.
CPC ................ *G01D 18/00* (2013.01); *G06F 15/00* (2013.01); *G06F 17/509* (2013.01); *G06F 2217/10* (2013.01); *G06F 2217/36* (2013.01)

(58) Field of Classification Search
CPC ........ G01D 18/00; G01D 21/00; G06F 15/00; G06F 17/509; G06F 2217/10; G06F 2217/36; G01V 1/24
USPC ......... 702/85, 93, 94, 95, 141, 142, 143, 150, 702/188; 356/138; 370/229; 701/300, 450; 703/13
See application file for complete search history.

(56) References Cited

U.S. PATENT DOCUMENTS

| 7,395,195 | B2 | 7/2008 | Suenbuel et al. | |
| 7,693,049 | B2 | 4/2010 | Joseph et al. | |
| 7,840,353 | B2 * | 11/2010 | Ouksel | G01D 21/00 701/300 |
| 8,265,870 | B1 * | 9/2012 | Nguyen | G01V 1/24 701/450 |
| 2008/0007720 | A1 | 1/2008 | Mittal | |

OTHER PUBLICATIONS

Rabie Ramadan, et al., "Optimal and Approximate Approaches for Deployment of Heterogeneous Sensing Devices", EURASIP Journal on Wireless Communications and Networking, 2007, pp. 1-14, vol. 2007, Hindawi Publishing Corporation, USA, XP002634589.

(Continued)

*Primary Examiner* — John H Le
(74) *Attorney, Agent, or Firm* — Baker & Hostetler LLP (57) ABSTRACT

An iterative method is provided, implemented by computer, of optimized design of a system for monitoring a geographical zone comprising a plurality of sensors of different types and characteristics represented by a vector S each component of which indicates the type and the characteristics of a sensor and its position in said zone, said system exhibiting a plurality of absolute technical constraints.

15 Claims, 5 Drawing Sheets

(56) References Cited

OTHER PUBLICATIONS

Rob A. Rutenbar, "Simulated Annealing Algorithms: An Overview", IEEE Circuits and Devices Magazine, Jan. 1, 1989, pp. 19-26, vol. 5, No. 1, IEEE Service Center, Piscataway, NJ, USA, XP000033521.

Patrick N. Ngatchou, "Multiobjective Multistatic Sonar Sensor Placement", 2006 IEEE Congress on Evolutionary Computations, Jul. 16-21, 2006, pp. 2713-2719, IEEE Service Center, Piscataway, NJ, USA, XP010936698.

* cited by examiner

METHOD FOR OPTIMALLY DETERMINING THE CHARACTERISTICS AND ARRANGEMENT OF A SET OF SENSORS FOR MONITORING AN AREA

CROSS-REFERENCE TO RELATED APPLICATIONS

This application is a National Stage of International patent application PCT/EP2011/062119, filed on Jul. 15, 2011, which claims priority to foreign French patent application No. FR 1003147, filed on Jul. 27, 2010, the disclosures of which are incorporated by reference in their entirety.

FIELD OF THE INVENTION

The subject of the present invention is a method for determining the characteristics and arrangement of a set of devices or sensors for monitoring a zone of interest.

It applies notably in aiding the design of a system for monitoring a zone of interest through a network of fixed sensors and in determining the optimum position and optimum adjustment of these sensors in the zone under a set of given constraints.

The invention applies to any type of device or sensor in particular a camera, a radar, a seismic or acoustic sensor or else a motion detection device.

BACKGROUND

The technical problem at which the present invention is aimed relates to the automatic allocation of a set of sensors, operating in a network, in a manner adapted to the monitoring of a predefined zone of interest. This problem is notably encountered by a monitoring system designer or a user of such a system. It consists, on the basis of a set of sensors each having specific characteristics according to particular technologies, of a set of absolute constraints to be complied with and of a set of properties that it is desired to optimize, in determining the combination, in terms of number and type from among those available, of sensors making it possible to satisfy these absolute constraints and to optimize these properties. A second problem is also aimed at determining the optimum position and optimum adjustment of the sensors determined previously within the monitoring zone so as to optimize performance for constrained resources.

The network of sensors chosen must comply with one or more absolute constraints, for example, a maximum budget, maximum energy reserve, maximum carriage or minimum detection performance.

The properties to be optimized are, for example, the total price of the system, a probability of target detection, an accuracy of location in two or three dimensions. The properties are classed empirically by relative significance.

The technical problem at which the present invention is aimed is a problem of constrained multicriterion optimization of a set of heterogeneous cost functions of arbitrary complexity. These functions being able to be of diverse nature, analytical or non-analytical, continuous or non-continuous, differentiable or non-differentiable. Some constraints may be expressed by simple functions. For example, the total price of the system corresponds to a simple sum of the prices of its constituents. Likewise the total weight of the system is also obtained by the sum of the weights of each sensor. On the other hand, other constraints are modeled by more complex functions. Thus the probability of detecting a target can depend on an a priori probability density of presence of the target, the target-sensor distance or indeed the intervisibility. Accuracy of location based on fusion between sensors can involve the probabilities of detection, the accuracies of elementary measurements and the mutual relative positions of the sensors.

The solutions of the prior art which address the problem of the optimization of sensor networks relate essentially to the deployment of networks of wireless devices and are aimed at optimizing the means of communication. The problem area thus tackled relates in particular to the maintaining of the service and the autonomy of the antennas and not the optimization of the coverage of a monitoring zone as a function of diverse constraints on the sensors.

Concerning the problem area of the optimal positioning of monitoring sensors, U.S. Pat. No. 7,395,195 proposes a device allowing the representation of a network of devices, the allocation of calculation resources and the positioning of said sensors. U.S. Pat. No. 7,693,049 implements a stochastic optimization technique essentially focused on the conservation of energy resources.

In addition to the fact that the two aforementioned patent applications are aimed at only part of the wider problem that the present invention proposes to solve, they also exhibit limitations in relation to the optimization constraints that they can take into account. Generally, the known schemes implement conventional optimization schemes such as the gradient scheme. Such schemes exhibit the following drawbacks. They afford a solution to the global optimization problem only if the optimization constraints are modeled by differentiable functions, this representing a significant limitation that the present invention is aimed at removing. Moreover these schemes do not make it possible to avoid the phenomena of local minima or maxima which represent unsatisfactory solutions. It is also possible to use schemes based on a genetic algorithm, but these are not applicable to all cost functionals and do not guarantee convergence to a valid solution in all cases.

SUMMARY OF THE INVENTION

The present invention makes it possible to remove the limitations of the prior art by proposing a completely automated solution for determining the sensors in terms of number, type and position.

For this purpose, the subject of the invention is an iterative method, implemented by computer, of optimized design of a system for monitoring a geographical zone comprising a plurality of sensors of different types and characteristics represented by a vector S each component of which indicates the type and the characteristics of a sensor and its position in said zone, said system exhibiting a plurality of absolute technical constraints, said method being characterized in that it comprises at least the following steps:

a step of initializing the vector S to a solution $S_0$, a step of perturbing the sensors making up the solution $S_n$ at the iteration of index n, to obtain a new candidate solution $s_{n+1}$ at the iteration of index n+1, said perturbation entailing changing the type or a characteristic of at least one of said sensors, the possible sensor types also including a dummy type whose characteristics have no impact on the global cost of the solution S, a step of evaluating the cost of said solution $s_{n+1}$ on the basis of a global cost function C(S) determined as a combination of a plurality of sub-criteria $C_k(S)$ for optimizing at least one characteristic of said sensors of which the solution S is composed, a step of selecting the new current solution $S_{n+1}$ at the iteration n+1 on the basis of a probability of transition $P_{transition} = \eta(C(S_n), C(s_{n+1}))$ which decreases as a function of $(C(s_{n+1})-C(S_n))$ culminating in the selection of the new candidate solution $S_{n+1}=s_{n+1}$ or in the retaining of the previous solution $S_{n+1}=S_n$, a step of storing, at each iteration, the best solution $S_{best}$ obtained which satisfies the relation:

if $C(s_{n+1}) < C(S_{best}), S_{best} = S_{n+1}$, a test step for stopping or continuing the iterations of said method, when the stopping test is positive, a final step of producing the optimal solution $S_{best}$ containing the number, the type, the characteristics and the position of the sensors suitable for monitoring said geographical zone.

In a variant embodiment of the invention, the method furthermore comprises a step of displaying the positions of said sensors making up the optimal solution $S_{best}$ in the geographical zone on a user interface.

In another variant embodiment of the invention, the initialization step comprises at least the following sub-steps:
random selection of the type of each of said sensors from among the available types, including the dummy type,
random selection of the position of each of said sensors,
verification of compliance, by the solution $S_0$, with all the absolute constraints.

In another variant embodiment of the invention, said sensors are of passive type and are at least taken from the following set: a camera, a radar, a seismic sensor, an acoustic sensor, a motion detection device, a detection device based on electrical contact, a device for detecting radioelectric sources, a device for detecting nuclear sources, a magnetic, capacitive, inductive, chemical or bacteriological detection device.

In another variant embodiment of the invention, said sensors are of active type and are at least taken from the following set: a radar, an active acoustic detector, a LIDAR detector, a detector based on neutron activation, an active-barrier-based detector.

In another variant embodiment of the invention, an absolute technical constraint is a constraint of maximum weight or maximum price or of minimum accuracy of location over a given geographical zone.

In another variant embodiment of the invention, a characteristic of a sensor comprises its weight, its price, its probability of detecting a target, its detection radius.

In another variant embodiment of the invention, an optimization sub-criterion is the global weight of the set of said sensors or the global price of the set of said sensors or the degree of coverage of the monitored zone or the accuracy of location of a target in the monitored zone, said sub-criterion being able to be computed numerically for the set of sensors making up the solution S.

In another variant embodiment of the invention, at least one of the sub-criteria depends on a significance map which allocates for each mesh cell, with coordinates i,j, of the geographical zone to be monitored, a relative significance value which increases with the monitoring requirement of said mesh cell.

In another variant embodiment of the invention, at least one of the following conventions is applied to the sub-criteria:
the optimization of the sub-criteria is either a minimization or a maximization,
the value of each sub-criterion is normalized between 0 and 1.

In another variant embodiment of the invention, the global cost function of the solution S is expressed with the aid of the following relation:

$$C(S) = \beta \sqrt{\frac{\sum_{k=1}^{K} \lambda_k \|C_k(S)\|^{\alpha_k}}{\sum_{k=1}^{K} \lambda_k}},$$

where $\lambda_k$ is a weighting coefficient, $\beta$ and $\alpha_k$ are given parameters.

In another variant embodiment of the invention, the probability of transition is expressed with the aid of the following relations:

$$\eta(C(S_n), C(s_{n+1})) = 1, \text{ if } C(s_{n+1}) < C(S_n)$$

$$\eta(C(S_n), C(s_{n+1})) = e^{\frac{C(S_n)-C(s_{n+1})}{T(n)}}, \text{ if } C(s_{n+1}) \geq C(S_n),$$

with T(n) a parameter whose effect is to render less probable the acceptance of a worse solution at iteration n and complying with the following relation $T(n+1) = \rho T(n)$, where $\rho$ is a given parameter whose value is less than 1 and substantially close to 1.

The subject of the invention is also a computer program product, characterized in that it comprises program code instructions for the implementation of the method according to the invention.

BRIEF DESCRIPTION OF THE DRAWINGS

Other characteristics will become apparent on reading the nonlimiting detailed description which follows, given by way of example and in relation to appended drawings which represent:

FIG. 2, a flowchart illustrating the steps of implementing the method according to the invention, FIG. 3, an illustration of the results obtained for a square uniform monitoring zone and a single type of sensor, FIG. 4, an illustration of the results obtained for a square uniform monitoring zone and four types of sensors, FIG. 5, an illustration of the results obtained for the monitoring zone of FIG. 1 and one type of sensor, FIG. 6, an illustration of the results obtained for the monitoring zone of FIG. 1 and two types of sensor.

DETAILED DESCRIPTION

Significance Map

A particular embodiment of the invention is now described. It relates to the optimization of a system for monitoring a zone of geometry defined by a rectangle. The invention applies in an identical manner to any type of zone of interest of arbitrary geometry. The monitoring zone of rectangular shape is cut up into a plurality of elementary mesh cells likewise of rectangular shape. The set of mesh cells constitutes a grid. Each mesh cell of the grid is identified by its coordinates i and j. Without departing from the scope of the invention, the shape of a mesh cell may be arbitrary.

Figure 1:
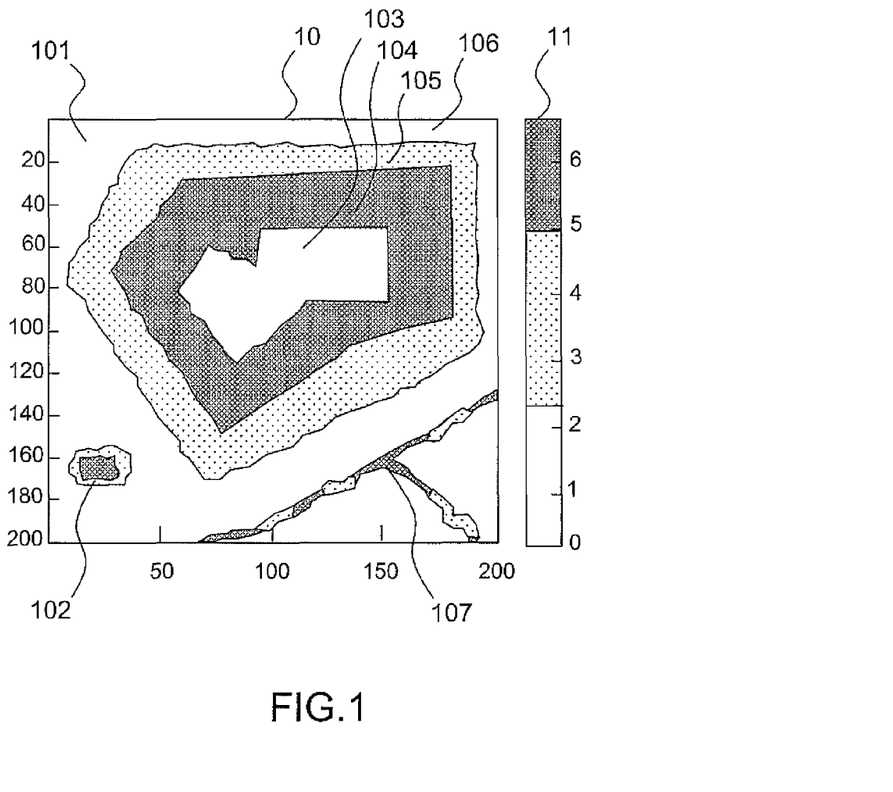
FIG. 1, an exemplary significance map according to the invention.

FIG. 1 represents an exemplary significance map according to the invention. The function of a significance map is the identification of zones of relative significance within the zone to be monitored. Certain sensor optimization constraints depend on the zone covered. Now, this zone may, on one hand, be delimited by perimeters that are complex to explain analytically and on the other hand, not be of uniform significance in operational terms. In a prior step, the method according to the invention consists in constructing the significance map 10 associated with the monitoring zone aimed at. For each mesh cell of the significance map labeled by its two coordinates i and j, a significance value $C(i,j)$ is allocated. This value is zero for the elements of the zone which are not intended to be monitored. In this way, the areas to be monitored can be of arbitrarily complex shape. The value $C(i,j)$ is nonzero and its value is all the larger value as the zone to be monitored is of interest. In particular, the interest in monitoring a zone is determined as a function of the probability of finding a target therein or of the sensitivity of the zone from the monitoring point of view. If no information is associated with a zone, its significance value $C(i,j)$ is equal to a uniform value, for example the value 1. Once the set of values $C(i,j)$ have been determined for all the mesh cells, they are normalized by the sum of all the values $C(i,j)$. The significance map according to the invention thus determined gives, for each mesh cell, information regarding relative significance in relation to its monitoring. The scale 11 of the values of $C(i,j)$ varies from 0 to 1. The monitoring zone 10 comprises unmonitored sectors 101,103, secondary zones of significance 105,106 and priority zones of significance 102,104, 107.

Sensors

The objective of the method according to the invention is notably to produce a solution to a problem of optimization under several constraints. For this purpose, a solution consists of a set of $N_{max}$ sensors represented by a vector. These sensors are of variable type and position. Sensors of fixed type and position can also be considered but they do not form part of the solution vector produced by the method according to the invention. However, they come into the calculation of the cost functionals developed further upstream of the description. By way of example the following list includes a large number of sensors compatible with the method according to the invention. Without departing from the scope of the invention any equivalent sensor is conceivable. The invention applies equally well to passive sensors as to active detectors.

Passive sensors incorporate notably visible or infrared cameras with motion detection, dated or otherwise, angular location or scene recognition, acoustic detectors such as microphones or hydrophones which can detect a presence, perform angular and/or distance-wise location and perform sound recognition, point-wise seismic detectors, such as a geophone, lineal detectors such as a piezo-electrical cable. Such seismic detectors may or may not perform dated detection together with seismic noise recognition. Passive sensors compatible with the present invention also encompass sensors of PIR (Passive InfraRed) type which also have the capacity to perform location, detectors based on electrical contact or contact breakage, motion detectors of accelerometer or inclinometer type, detectors of radioelectric sources, of nuclear sources, passive radars together with any equipment implementing magnetic, capacitive, inductive, chemical or bacteriological detection.

Active detectors encompass notably radars, active acoustic detectors of aerial and sonar type, airborne-laser-based detectors of LIDAR ("Light Detection and Ranging") type and equipment performing detection based on neutron activation or on infrared, acoustic or visible active barrier.

T denotes the number of distinct sensor types. Each sensor type possesses intrinsic characteristics which come into the criterion for evaluating the quality of a solution obtained by the method. The characteristics of a sensor are defined by the set of parameters totally describing a type of sensor in the sense of a global cost function. These characteristics may be fixed when dealing with parameters intrinsic to the sensor such as the angular aperture of a camera or internal calculation functions such as the calculation mode for inter-visibility between sensor and monitored point. The characteristics of a sensor may also be adjustable by way of a method. Such is the case for example for the axis of aim of a camera.

The type of a sensor designates a class of sensors possessing common fixed characteristics. Several instances of one and the same type of sensor differ only by their variable characteristics.

The type of a sensor may be, but not solely, a camera, a radar, a seismic or acoustic sensor or else a motion detection device. The characteristics of said sensors may be fixed, such is the case for the weight or for the volume of a sensor and also for its angular observation field or the nature of the elementary measurements carried out. Such measurements include the absolute energy level or that in terms of signal-to-noise ratio, measurements of elevational or Euler bearing angles, measurements of speed, of distances, of frequency spectrum or else of class of target detected.

Other characteristics may evolve as a function of the solution. Such is the case for the price which can be degressive as a function of the quantity of sensors of the same type that are used in the solution. Certain sensors are characterized by a performance curve. Such is the case notably for the probability of detecting a target as a function of the distance between the sensor and the target and also the accuracy of measurement of a sensor as a function of its range and of the signal-to-noise ratio. Each available sensor type is thus defined as a function of one or more characteristics so as to constitute a set of available sensors which serves as input datum to the method according to the invention. To this set of T real sensor types is added a sensor of dummy type identified by the type 0. This sensor has no impact on the global cost criterion, that is to say its characteristics are neutral. For example its price, its weight and its range are zero. A solution provided by the optimization method according to the invention consists of a vector of $N_{max}$ sensors which are represented by their type indexed by a value varying from 0 to T. A type incorporates all the intrinsic characteristics of the sensor. The solution also comprises for each of said sensors information relating to its position (coordinates in the plane or in space) and/or its orientation (direction of pointing of the sensor). Hereinafter, S will denote the solution vector produced by the method according to the invention.

Absolute Constraints

The network of sensors is determined, notably, as a function of a set of M absolute constraints to be complied with which constitute another input datum of the method according to the invention. The absolute constraints to be complied with by the network of sensors chosen are taken from the following set: a minimum or maximum total weight of the set of sensors making up the network, a minimum or maximum total price, a bound on the position of deployment of a given sensor type, a minimum or maximum number of sensors of a given type, a minimum or maximum distance between two sensors of one and the same type, a minimum or maximum lifetime of a sensor, a maximum energy reserve of a sensor, a limit on the orientation of a sensor, a limit on the delay in transmitting the information to a command post, a deployment constraint such as a minimum distance of a type of sensor with respect to an element of the terrain or else minimum performance of the network in terms of range of detection, location or classification. The set of listed constraints is of course wholly non-limiting and any other absolute constraint relating to a sensor which is equivalent is conceivable without departing from the scope of the invention. Generally, each absolute constraint is modeled by a function, for example a Boolean function, $\psi_m(S)$ making it possible to verify whether each constraint m is or is not satisfied for the solution S. The solution S is acceptable if and only if, whatever m varying from 1 to M, $\psi_m(S)=1$. By way of example, the function $\psi_m$ associated with the weight constraint equals 0 if the sum of the weights of all the sensors constituting the solution S is greater than a given maximum weight. $\psi_m$ equals 1 in the converse case. In an analogous manner, any absolute constraint can be modeled by a function $\psi_m$.

Optimization Criteria

The optimal solution S is determined as a function of a number K of sub-criteria which constitute another set of input data of the method according to the invention. A sub-criterion corresponds to a characteristic or a combination of characteristics of one or more sensors making up the solution S. A sub-criterion is a numerically evaluatable function contributing to the calculation of a global cost function to the network of sensors. It is interpretable by the user of the method according to the invention, with the aim of weighting the relative significance thereof in the global cost to be optimized. The examples of sub-criteria which follow are applicable to the method according to the invention, as well as any equivalent to one of these sub-criteria. It involves the total weight of the solution, the total cost of the solution, the maximum detection probability over a zone, the mean detection probability over the whole of the zone, the minimum location error over a zone, the mean location error over the whole of the zone, the sum of the inter-sensor distances, the minimum path between a fixed point of the map and each sensor, the delay in transmitting the detection information for the set of sensors of a zone, the total consumption of the set of sensors and also composite constraints involving arbitrarily complex elements such as the minimization of the mean altitude of the sensors situated at a given distance from a part of the monitored zone.

This sub-criterion must be optimized, for example minimized or maximized. The term optimization is used to designate the search for an extremum, maximum or minimum.

By way of nonlimiting example, the embodiment chosen here uses K=4 sub-criteria. A first sub-criterion corresponds to the global weight of the set of sensors constituting the solution S. This first sub-criterion is modeled by the following function:

$$C'_1(S) = \sum_{n=1}^{N_{max}} \text{weight}(n) \quad (1)$$

where weight(n) is the weight of each sensor of the solution S. The method according to the invention is aimed at obtaining a solution S which minimizes the sub-criterion $C'_1(S)$.

A second sub-criterion corresponds to the global price of the solution S adopted. It may be modeled by the following function:

$$C'_2(S) = \sum_{n=1}^{N_{max}} \text{price}(n) \quad (2)$$

where price(n) is the unit price of each sensor of the solution S. The method according to the invention is aimed at obtaining a solution S which minimizes the sub-criterion $C'_2(S)$.

A third sub-criterion corresponds to the degree of coverage of the zone actually monitored by the network of sensors constituted by the solution S. The degree of coverage is defined, for example, as being the fraction of the monitored zone which guarantees a detection probability of greater than a given value $\theta$. This third sub-criterion is modeled by the following function:

$$C'_3(S) = \frac{\sum_{i,j}^{R} \zeta(i,j)CI(i,j)}{N_C N_L \sum_{i,j}^{R} CI(i,j)} \quad (3)$$

where $N_C N_L$ is the number of mesh cells of the significance map of dimension R and $\zeta(i,j)=1$ if the probability of detection $P_D(i,j)$ of a target situated in the mesh cell with coordinates i,j, of the significance map is strictly greater than $\theta$ and $\zeta(i,j)=0$ in the converse case. $CI(i,j)$ represents the significance value of the significance map at the point with coordinates i,j. The probability of detection $P_D(i,j)$ is determined as a function of the unit probability of detection and of the position of each sensor. By way of example, for an optronic sensor the probability of detection can be obtained by casting rays from the position of the sensor until they are intercepted by a mask or reach a range of use. For an acoustic sensor, the probability of detection can be calculated by applying the known equation of the sonar to a model of noise radiated by the target. The sub-criterion $C'_3(S)$ depends at one and the same time on the characteristics of each sensor and also the significance value $CI(i,j)$ associated with each mesh cell of the significance map corresponding to the monitoring zone. Other criteria of this type can be envisaged without departing from the scope of the invention.

A fourth sub-criterion corresponds to the accuracy of location of a target which can be defined as being the mean location error over the whole of the zone of coverage. The location of a target is obtained by merging several measurements delivered by several sensors. This sub-criterion thus itself depends on the third sub-criterion relating to the degree of coverage.

It is constructed on the basis of a local estimation of the location error with the aid of the known theoretical Cramer Rao bound and depends, notably, on the relative position of the set of sensors in terms of detection range at the point with coordinates i,j. This example shows that several sub-criteria may be interdependent. The sub-criterion relating to location accuracy may be modeled by the following relation:

$$C'_4(S) = \frac{\sum_{i,j}^{\zeta(i,j)>0} \text{Errorloc}(i,j)CI(i,j)}{\sum_{i,j}^{\zeta(i,j)>0} CI(i,j)} \quad (4)$$

A very large error can be assigned at any point where location is impossible.

The aforementioned examples of sub-criteria illustrate their diversity. The first two sub-criteria are simple sums whereas the third sub-criterion depends on the arrangement of the sensors and also, optionally, the obstacles between the sensor and the target. Finally the fourth sub-criterion illustrates the possibility of subordinating the calculation of one sub-criterion to another.

In one embodiment of the invention, conventions are established for the modeling of the sub-criteria. A first convention consists in devising the sub-criteria in such a way that the optimization is a minimization for all the sub-criteria or a maximization for all the sub-criteria. If the optimization is a minimization, the third sub-criterion described previously must be replaced with $C_3 = 1 - C'_3$. A second convention consists in normalizing between 0 and 1 each sub-criterion so as to render them homogeneous. The first, second and fourth sub-criteria may then be rewritten in the following manner:

$$C_1(S) = \frac{C'_1(S)}{WeightMax}, \quad C_2(S) = \frac{C'_2(S)}{PriceMax}, \quad C_4(S) = \frac{C'_4(S)}{ErrorMax}$$

where WeightMax and PriceMax are the weight and price not to be exceeded. ErrorMax is the admissible maximum location error to guarantee reasonable performance for the system. A third convention consists in assigning a large arbitrary value to a sub-criterion if it corresponds to an absolute constraint that is not complied with, in the case where the optimization is a minimization.

On the basis of the K sub-criteria $C_k(S)$, one of the steps constituting the method according to the invention is aimed at determining a global cost functional which can be written with the aid of the following relation:

$$C(S) = \sqrt[\beta]{\frac{\sum_{k=1}^{K} \lambda_k \|C_k(S)\|^{\alpha_k}}{\sum_{k=1}^{K} \lambda_k}} \quad (5)$$

The coefficients $\alpha_k$ allow nonlinear modulation of the impact of a sub-criterion according to its value. The positive coefficients $\lambda_k$ allow relative weighting of each sub-criterion with respect to the others. Among the particular cases, if $\beta = \alpha_k = 1$ whatever k then C(S) corresponds to a linear combination of the sub-criteria $C_k(S)$. Conversely if $\beta = \alpha_k$ tends to infinity, the global criterion C(S) tends to the maximum of the sub-criteria $C_k(S)$.

Relation (5) is an exemplary modeling of the global criterion. Without departing from the scope of the invention, any relation C(S) determined as a combination of the sub-criteria $C_k(S)$ is compatible with the invention. In particular the function C(S) is not necessarily continuous or differentiable at every point where it is defined.

The method according to the invention is notably aimed at determining the solution S which minimizes (or maximizes) the global cost function C(S) while complying with the previously defined absolute constraints. The known schemes based on employing gradients are not compatible with cost functions that are non-differentiable and which may exhibit local extrema. To solve these limitations, the invention consists in adapting the known so-called "simulated annealing" algorithm to solve the optimization problem associated with the cost function C(S).

Figure 2:
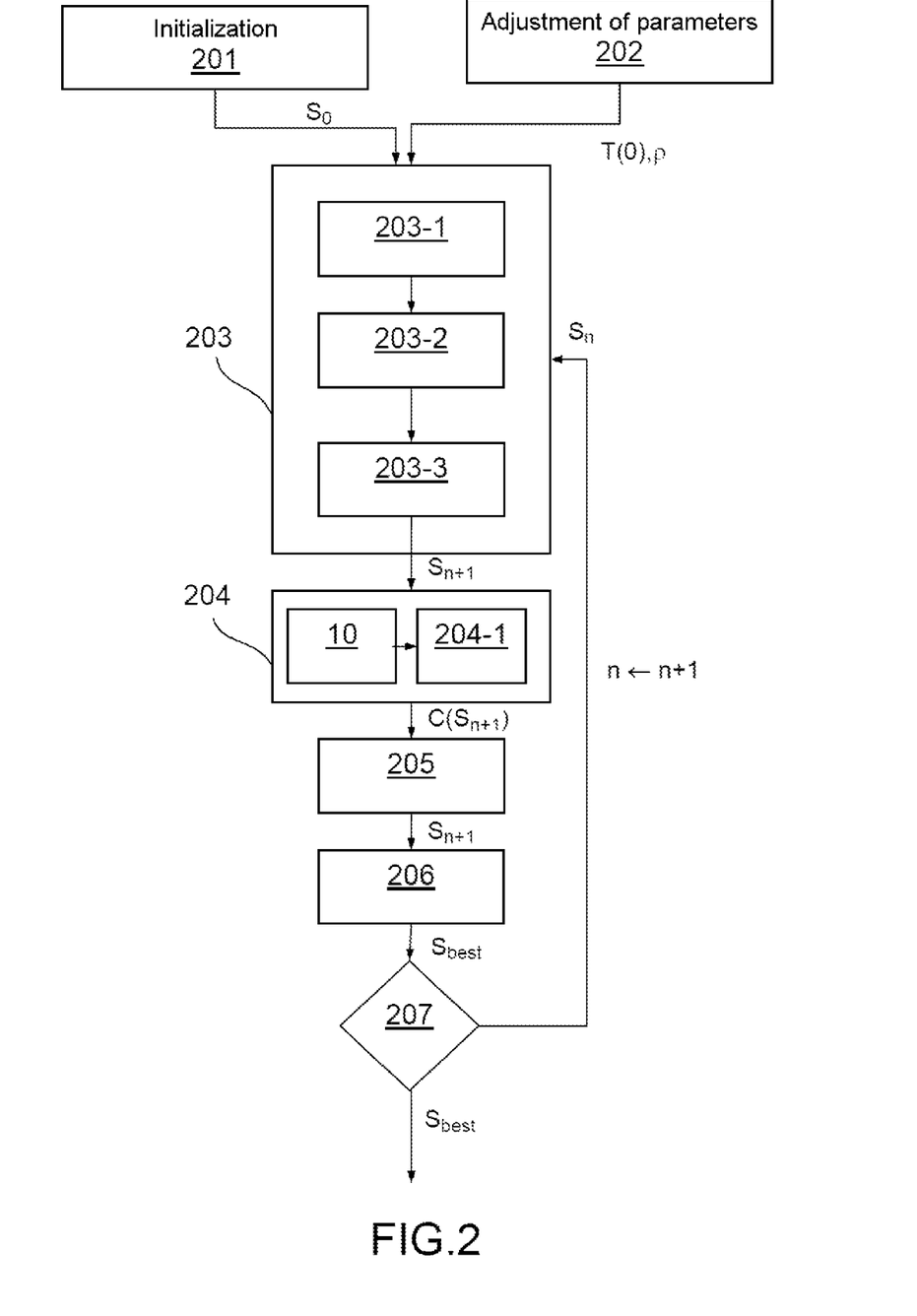

FIG. 2 represents a flowchart of the steps of carrying out the method according to the invention.

In a first initialization step 201, an initial candidate solution $S_0$ is selected. It comprises, like any solution S, a set of $N_{max}$ sensors defined by their type, their position and their technical characteristics. Some among the $N_{max}$ sensors may be sensors of dummy type whose relative weight is zero in relation to the optimization constraints. The presence of sensors of dummy type in a solution S makes it possible to also determine the optimum number of sensors since a dummy sensor serves only in solving the problem but does not correspond to a sensor that is actually deployed in the field.

The initial solution $S_0$ is determined for example as being composed solely of dummy sensors. This solution is valid since by construction the dummy sensors comply with the predefined absolute constraints. The positions of the dummy sensors are drawn randomly in the monitoring zone. Alternatively, the initial solution $S_0$ can also be determined by random selection of each type and position of the $N_{max}$ sensors including the dummy sensor as one of the possibilities. The solution $S_0$ obtained is tested in relation to the absolute constraints. If the solution is not acceptable from this point of view, a new solution is randomly drawn until a solution that is compatible with the absolute constraints is obtained.

The solution $S_0$ is thereafter stored as being, temporarily, the solution $S_{best}$ which corresponds to the best possible optimization of the problem. In parallel with this initialization step, a step of initial adjustment 202 of the parameters of the optimization algorithm is performed. For a so-called "simulated annealing" algorithm, this entails a positive convergence so-called temperature parameter T(0) which is fixed initially, for example, at 1 and a so-called "cooling" parameter ρ, which is positive and less than or equal to 1. The values of these parameters directly influence the speed of convergence of the algorithm and its ability to find global optima. An initial temperature and initial cooling parameter that are too low lead to very rapid convergence to local minima or maxima. Conversely, high values of these parameters make it possible to converge to global optima but the calculation times are longer.

The method according to the invention is thereafter iterative. An iteration consists in carrying out the following steps.

In a step 203, a solution $S_{n+1}$ which differs from the current solution $S_n$ is sought. Accordingly, the current solution $S_n$ is perturbed so as to deduce therefrom an intermediate solution $s'_{n+1}$ for each sensor of index i varying from 1 to $N_{max}$ constituting the solution $S_n$.

In a first sub-step 203-1, a perturbation of the type of each sensor is caused. Accordingly, a uniform random value lying between 0 and 1 is generated. If the value obtained is less than a given probability of change of type of the sensor, a new type of sensor Type(i), drawn randomly from among the set of available types of sensor, is substituted for the former type. The probability of change of type is a parameter of the method.

In a second sub-step 203-2, all the characteristics associated with the sensor of index i are perturbed according to the scheme of step 203-1. For example, the position of the sensor is perturbed by adding to it a random value, for example of Gaussian type. The position of the sensor is perturbed only at a frequency determined by a parameter of probability of change of position of the sensor. If an absolute constraint exists on this quantity, for example that the position of the sensor is restricted to a given zone, the perturbation is applied only in the case of compliance with this constraint. This perturbation step is also applied to the sensors of dummy type.

In a third sub-step 203-3, the acceptability of the solution $s'_{n+1}$ obtained after perturbing the solution $S_n$ is determined. If the solution $s'_{n+1}$ is not acceptable in relation to the absolute constraints and if the number of draws $N_{draw}$ of a candidate solution is not reached, step 203-1 is returned to so as to determine a new candidate solution $s'_{n+1}$ which complies with the absolute constraints. If no acceptable solution is determined after the $N_{draw}$ draws then the last solution $s'_{n+1}$ obtained is retained as current solution, $s_{n+1}=s'_{n+1}$.

In a second step 204, the global cost function C(S) is evaluated for the solution $s_{n+1}$. This evaluation is carried out on the basis of the prior evaluation 204-1 of the set of sub-criteria $C_k(S)$ such as was described previously. Some of these sub-criteria require the generation of a significance map 10.

In a third step 205, the new current solution is selected by applying an adaptation, according to the invention, of the so-called "simulated annealing" algorithm. A probability of acceptance of the new solution, also called the transition probability, is evaluated as a function η of the costs of the solutions $S_n$ and $s_{n+1}$:

$P_{transition} = \eta(C(S_n), C(s_{n+1}))$.

Any function η leading to a larger probability for a better solution is acceptable, this amounting to saying that the transition probability must decrease as a function of $(C(s_{n+1})-C(S_n))$. For example, for a so-called conventional simulated annealing algorithm, this function may be written with the aid of the following relations:

$$\eta(C(S_n), C(s_{n+1})) = 1, \text{ if } C(s_{n+1}) < C(S_n)$$

$$\eta(C(S_n), C(s_{n+1})) = e^{\frac{C(S_n)-C(s_{n+1})}{T(n)}}, \text{ if } C(s_{n+1}) \geq C(S_n)$$

Step 205 thus consists in generating a uniform random variable u(n) lying between 0 and 1 and in comparing it with the threshold $\eta(C(S_n), C(s_{n+1}))$. If u(n) is less than said threshold then the new solution $s_{n+1}$ becomes the current solution. In the converse case the solution $S_n$ is retained:

If $u(n) < \eta(C(S_n),C(s_{n+1})), S_{n+1} = s_{+1}$

If $u(n) \geq \eta(C(S_n),C(s_{n+1})), S_{n+1} = S_n$

In an additional step 206, the best of the solutions obtained is stored:

if $C(s_{n+1}) < C(S_{best}), S_{best} = S_{n+1}$.

At each iteration, the temperature parameter is modified so as to render less probable the acceptance of a poorer solution at the following iteration. For a so-called conventional simulated annealing algorithm, this is obtained through the following relation: $T(n+1) = \rho T(n)$ with ρ a value less than 1. Typically a value very close to 1 yields good results.

A stopping test 207 is performed at each iteration so as to decide whether stopping the search for a better solution. If the stopping condition is not fulfilled, the iterations are continued. By way of nonlimiting example, the stopping test can consist in verifying whether the best solution $S_{best}$ has been unchanged for at least $N_{stop}$ iterations, in which case the stopping test is positive and the method according to the invention delivers the best solution obtained. The stopping test can also consist in fixing a maximum number of iterations.

The method according to the invention is implemented by way of a computer program. A display interface can be used to view the position of the sensors forming the solution $S_{best}$ obtained over the determined monitoring zone. Other characteristics of said sensors can also be displayed such as the range or the orientation when dealing with a directional sensor.

Figure 3:
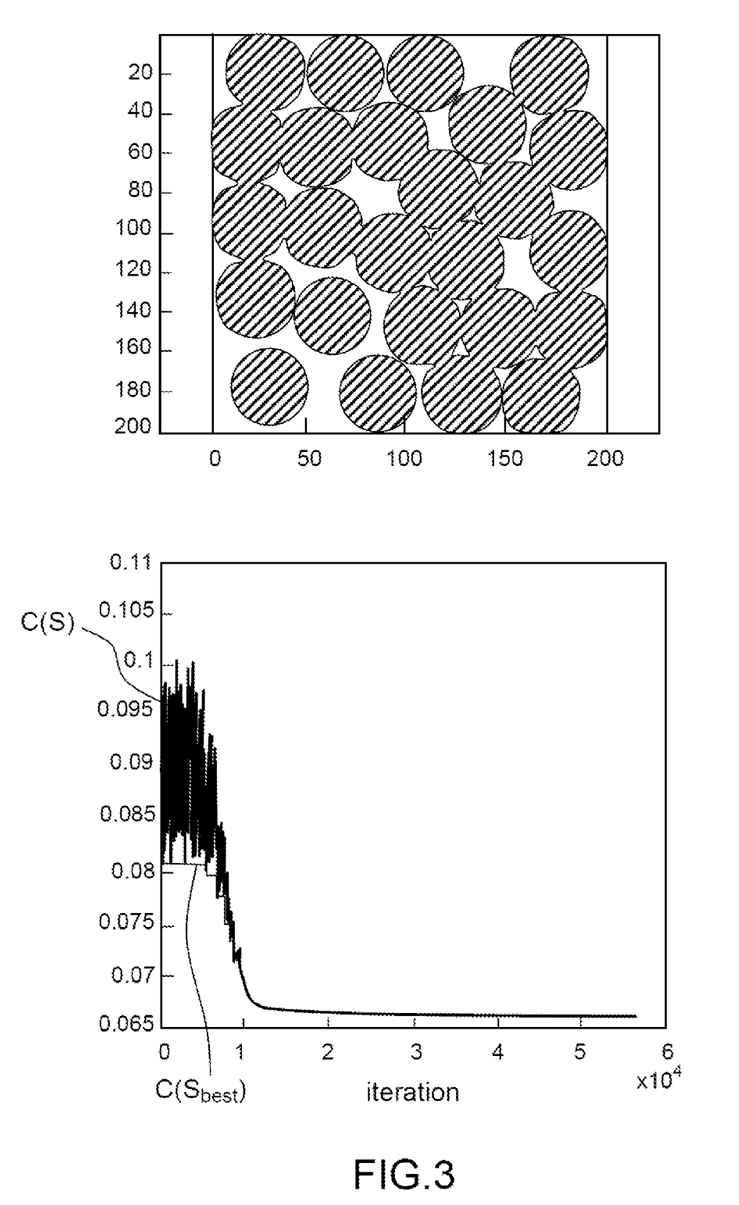

FIG. 3 illustrates the results obtained by the method according to the invention in the case where the monitoring zone is of square shape and uniform in terms of significance. A single type of sensor is available and it exhibits a target detection probability equal to 1 for a distance between the sensor and the target of less than a given detection radius D and equal to 0 in the converse case. The constraints taken into account are the maximization of the monitored zone with a uniform significance map with a given maximum given weight and budget. The top part of FIG. 3 illustrates the position of each sensor in the monitoring zone with their zone of coverage represented by a circle centered on the position of the sensor and of radius equal to the detection radius. The bottom part of FIG. 3 shows the evolution, in the course of the iterations of the method according to the invention, of the cost functions C(S) and $C(S_{best})$ of the current solutions and of the best solution respectively. When the method stops, the theoretical optimal number of sensors, which in the example of FIG. 3 is equal to 25, is obtained. The position of the sensors is not regular since the imposed constraint is the maximization of the zone of coverage without any regularity criterion.

Figure 4:
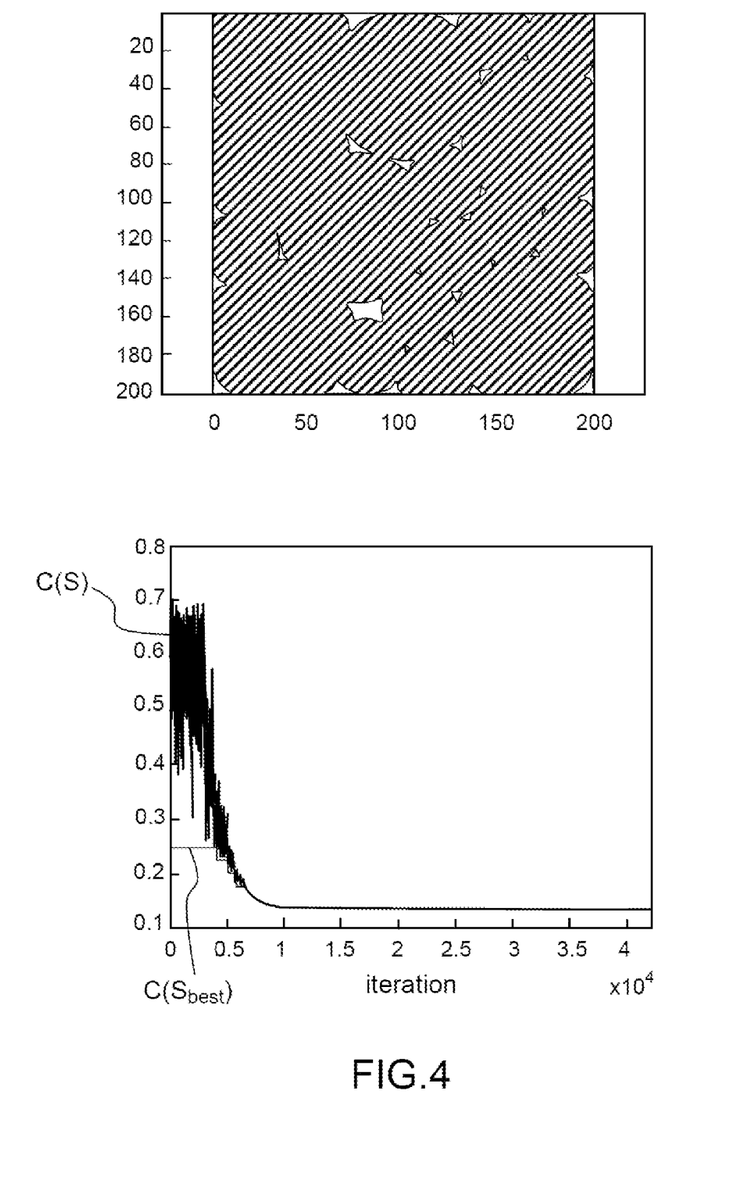

FIG. 4 illustrates the results obtained for the same monitoring zone as in FIG. 3 but with four types of different devices presenting different probabilities of detection. It is noted that in this case the degree of coverage is improved.

Figure 5:
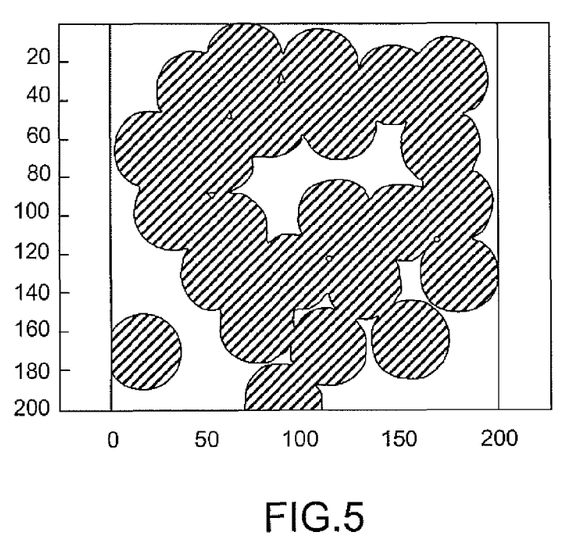

FIG. 5 illustrates the results obtained for the automatic placement of sensors for a monitoring zone associated with the significance map of FIG. 1. A single type of sensor is taken into account, namely the same as that used for the example of FIG. 3.

Figure 6:
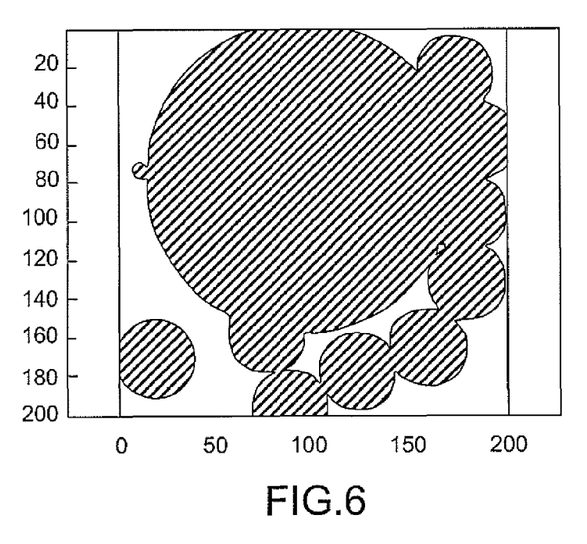

FIG. 6 illustrates the results obtained, still for the significance map of FIG. 1, but using two types of sensors, one of which exhibits a substantially more significant detection radius than the other.

The invention applies notably to the monitoring of industrial sites, of town centers, of a building or of any other zone of interest. It makes it possible to determine an optimal solution in terms of type, number and position of a set of sensors with given characteristics under a set of constraints expressed in the form of numerically evaluatable sub-criteria. The optimal solution is determined by improving, at each iteration of the method, the current solution. The method according to the invention uses, in part, the known so-called "simulated annealing" scheme which is generally used to describe the evolution of a thermodynamic system. This scheme is used here in a distinct domain which is that of the optimization of the choice and of the positioning of a set of sensors suitable for monitoring a given geographical zone.

The method according to the invention presents notably the advantage of allowing a solution to be obtained even when the cost functional C(S) used is not a function which is differentiable at every point. It also makes it possible to avoid selecting a solution in a local extremum of this function.

The invention claimed is:

1. An iterative method, implemented by a computer, for optimizing the design of a system for monitoring a geographical zone comprising a plurality of sensors of different types and characteristics represented by a vector S comprising the type and the characteristics of a sensor and its position in said zone, said system exhibiting a plurality of absolute technical constraints that must be respected by the plurality of sensors of said system, said method comprising the following steps implemented by the computer comprising at least a processor and a memory:

initializing the vector S to a solution $S_0$, perturbing the sensors making up the solution $S_n$ at the iteration of index n, to obtain a new candidate solution $s_{n+1}$ at the iteration of index n+1, said perturbation entailing changing the type or the characteristic of at least one of said sensors, the possible sensor types also including a dummy type whose characteristics have no impact on the global cost of the solution S, evaluating the cost of said solution $s_{n+1}$ on a basis of a global cost function C(S) determined as a combination of a plurality of sub-criteria $C_k(S)$ for optimizing at least one characteristic of said plurality of sensors of which the solution S is composed, selecting the new current solution $S_{n+1}$ at the iteration n+1 on the basis of a probability of transition $P_{transition}=\eta(C(S_n), C(s_{n+1}))$ which decreases as a function of $(C(s_{n+1})-C(S_n))$ culminating in a selection of the new candidate solution $S_{n+1}=s_{n+1}$ or in the retaining of the previous solution $S_{n+1}=S_n$, storing, at each iteration, the best solution $S_{best}$ obtained which satisfies the relation:

if $C(s_{n+1}) < C(S_{best}), S_{best} = S_{n+1}$, a test step for stopping or continuing the iterations of said method, and when the stopping test is positive, a final step of producing the optimal solution $S_{best}$ containing the number, the type, the characteristics and the position of the sensors suitable for monitoring said geographical zone.

2. The method as claimed in claim 1, further comprising displaying the positions of said sensors making up the optimal solution $S_{best}$ in the geographical zone on a user interface.

3. The method as claimed in claim 1, wherein the initialization step comprises at least the following sub-steps:
random selection of the type of each of said sensors from among the available types, including the dummy type,
random selection of the position of each of said sensors,
verification of compliance, by the solution $S_0$, with all the absolute constraints.

4. The method as claimed in claim 1, wherein said sensors are of passive type and are at least taken from the following set: a camera, a radar, a seismic sensor, an acoustic sensor, a motion detection device, a detection device based on electrical contact, a device for detecting radioelectric sources, a device for detecting nuclear sources, a magnetic, capacitive, inductive, chemical or bacteriological detection device.

5. The method as claimed in claim 1, wherein said sensors are of active type and are at least taken from the following set: a radar, an active acoustic detector, a LIDAR detector, a detector based on neutron activation, an active-barrier-based detector.

6. The method as claimed in claim 1, wherein an absolute technical constraint is a constraint of maximum weight or maximum price or of minimum accuracy of location over a given geographical zone.

7. The method as claimed in claim 1, wherein a characteristic of a sensor comprises its weight, its price, its probability of detecting a target, its detection radius.

8. The method as claimed in claim 1, wherein an optimization sub-criterion is the global weight of the set of said sensors or the global price of the set of said sensors or the degree of coverage of the monitored zone or the accuracy of location of a target in the monitored zone, said sub-criterion being able to be computed numerically for the set of sensors making up the solution S.

9. The method as claimed in claim 8, wherein at least one of the sub-criteria depends on a significance map which allocates for each mesh cell, with coordinates i,j, of the geographical zone to be monitored, a relative significance value which increases with the monitoring requirement of said mesh cell.

10. The method as claimed in claim 9, wherein at least one of the following conventions is applied to the sub-criteria:
the optimization of the sub-criteria is either a minimization or a maximization,
the value of each sub-criterion is normalized between 0 and 1.

11. The method as claimed in claim 8, wherein at least one of the following conventions is applied to the sub-criteria:
the optimization of the sub-criteria is either a minimization or a maximization,
the value of each sub-criterion is normalized between 0 and 1.

12. The method as claimed in claim 1, wherein the global cost function of the solution S is expressed with the aid of the following relation:

$$C(S) = \beta \sqrt{\frac{\sum_{k=1}^{K} \lambda_k \|C_k(S)\|^{\alpha_k}}{\sum_{k=1}^{K} \lambda_k}},$$

where $\lambda_k$ is a weighting coefficient, $\beta$ and $\alpha_k$ are given parameters.

13. The method as claimed in claim 1, wherein the probability of transition is expressed with the aid of the following relations:

$$\eta(C(S_n), C(s_{n+1})) = 1, \text{ if } C(s_{n+1}) < C(S_n)$$

$$\eta(C(S_n), C(s_{n+1})) = e^{\frac{C(S_n)-C(s_{n+1})}{T(n)}}, \text{ if } C(s_{n+1}) \geq C(S_n),$$

with T(n) a parameter the effect of which is to render less probable the acceptance of a poorer solution at iteration n and complying with the following relation $T(n+1)=\rho T(n)$, where $\rho$ is a given parameter whose value is less than 1 and substantially close to 1.

14. A computer program, comprising program code instructions for the implementation of the method as claimed in claim 1, wherein said computer program is executed on a computer.

15. An iterative method, implemented by a computer, for optimizing the design of a system for monitoring a geographical zone comprising a plurality of sensors of different types and characteristics represented by a vector S comprising the type and the characteristics of a sensor and its position in said zone, said system exhibiting a plurality of absolute technical constraints that must be respected by the plurality of sensors of said system, said method comprising the following steps implemented by the computer comprising at least a processor and a memory:
initializing the vector S to a solution $S_0$ with the computer,
perturbing the sensors making up the solution $S_n$ at the iteration of index n with the computer, to obtain a new candidate solution $s_{n+1}$ at the iteration of index n+1, said perturbation entailing changing the type or the characteristic of at least one of said sensors, the possible sensor types also including a dummy type whose characteristics have no impact on the global cost of the solution S, evaluating with the computer the cost of said solution $s_{n+1}$ on a basis of a global cost function C(S) determined as a combination of a plurality of sub-criteria $C_k(S)$ for optimizing at least one characteristic of said plurality of sensors of which the solution S is composed, selecting with the computer the new current solution $S_{n+1}$ at the iteration n+1 on the basis of a probability of transition $P_{transition} = \eta(C(S_n), C(s_{n+1}))$ which decreases as a function of $(C(s_{n+1}) - C(S_n))$ culminating in a selection of the new candidate solution $S_{n+1} = s_{n+1}$ or in the retaining of the previous solution $S_{n+1} = S_n$, storing in the memory, at each iteration, the best solution $S_{best}$ obtained which satisfies the relation:

if $C(s_{n+1}) < C(S_{best}), S_{best} = S_{n+1}$, implementing with the computer a test step for stopping or continuing the iterations of said method, and providing to a user interface when the stopping test is positive, the optimal solution $S_{best}$ containing the number, the type, the characteristics and the position of the sensors suitable for monitoring said geographical zone.

* * * * *